United States Patent
Coburn et al.

(10) Patent No.: US 11,797,982 B2
(45) Date of Patent: Oct. 24, 2023

(54) DIGITAL LEDGER AUTHENTICATION USING ADDRESS ENCODING

(71) Applicant: FirstBlood Technologies, Inc., Everett, MA (US)

(72) Inventors: Zachary Robert Coburn, Chicago, IL (US); Daniel Temkin, Milton, MA (US); Mikko Matias Ohtamaa, Helsinki (FI)

(73) Assignee: FirstBlood Technologies, Inc., Everett, MA (US)

( * ) Notice: Subject to any disclaimer, the term of this patent is extended or adjusted under 35 U.S.C. 154(b) by 1288 days.

(21) Appl. No.: 16/138,146

(22) Filed: Sep. 21, 2018

(65) Prior Publication Data
US 2019/0019180 A1    Jan. 17, 2019

Related U.S. Application Data

(63) Continuation-in-part of application No. 15/861,948, filed on Jan. 4, 2018, now Pat. No. 10,572,872.
(Continued)

(51) Int. Cl.
*G06Q 20/06*    (2012.01)
*G06Q 20/38*    (2012.01)
(Continued)

(52) U.S. Cl.
CPC ....... *G06Q 20/3678* (2013.01); *G06Q 20/065* (2013.01); *G06Q 20/3829* (2013.01);
(Continued)

(58) Field of Classification Search
CPC .. G06Q 20/065; G06Q 20/36; G06Q 20/3678; G06Q 20/382; G06Q 20/3827;
(Continued)

(56) References Cited

U.S. PATENT DOCUMENTS 6,443,841 B1    9/2002  Rossides
7,367,888 B1    5/2008  Chen et al.
(Continued)

FOREIGN PATENT DOCUMENTS

WO    WO2016073589 A1    5/2016

OTHER PUBLICATIONS

Benila, S. et al.,"Crowd Funding using Blockchain", Global Research and Development Journal for Engineering, vol. 4, issue 4, Mar. 2019. [retrieved Mar. 6, 2023]. [Retrieved from the internet <URL: https://www.academia.edu/38902661/Crowd_Funding_using_Blockchain>. 6 pages.*

(Continued)

*Primary Examiner* — Lawrence S Galka
(74) *Attorney, Agent, or Firm* — Adams Intellex, PLC

(57) ABSTRACT

Disclosed techniques enable digital ledger authentication using address encoding. A digital ledger is accessed. A wallet address is determined for a user, where the wallet address is associated with a cryptocurrency in the digital ledger. The wallet address is hashed and signed, where the signing is performed using a private key from a digital purveyor. A digitally mapped value is encoded based on the wallet address. A transaction is authenticated based on reverifying the digitally mapped value with a re-encoding or re-signing the wallet address. The reverified digitally mapped value is used to enable a smart contract. An entry is appended to the digital ledger, where the entry includes the digitally mapped value. A transaction is rejected due to the re-encoding of the wallet address not having a correct private key signature, based on non-authentication.

22 Claims, 9 Drawing Sheets

Related U.S. Application Data

(60) Provisional application No. 62/561,981, filed on Sep. 22, 2017, provisional application No. 62/443,086, filed on Jan. 6, 2017.

(51) Int. Cl.
| | | |
|---|---|---|
| *H04L 9/14* | (2006.01) | |
| *H04L 9/06* | (2006.01) | |
| *H04L 9/30* | (2006.01) | |
| *G06Q 20/36* | (2012.01) | |
| *H04L 9/32* | (2006.01) | |
| *H04L 9/00* | (2022.01) | |

(52) U.S. Cl.
CPC .......... *H04L 9/0637* (2013.01); *H04L 9/0643* (2013.01); *H04L 9/3213* (2013.01); *H04L 9/3239* (2013.01); *H04L 9/3247* (2013.01); *G06Q 2220/00* (2013.01); *H04L 9/50* (2022.05); *H04L 2209/56* (2013.01)

(58) Field of Classification Search
CPC ............ G06Q 20/3829; G06Q 20/401; G06Q 2220/00; H04L 63/0435; H04L 63/0442; H04L 63/08; H04L 63/0807; H04L 63/0823; H04L 63/10; H04L 2463/102; H04L 9/3213; H04L 9/3247
See application file for complete search history.

(56) References Cited

U.S. PATENT DOCUMENTS

| | | |
|---|---|---|
| 9,298,806 B1 | 3/2016 | Vessenes et al. |
| 9,635,000 B1 | 4/2017 | Muftic |
| 9,659,439 B1 | 5/2017 | Aleksey |
| 9,667,427 B2 | 5/2017 | Oberhauser et al. |
| 2007/0265092 A1 | 11/2007 | Betteridge |
| 2009/0170604 A1 | 7/2009 | Mueller et al. |
| 2011/0196723 A1 | 8/2011 | Baszucki et al. |
| 2015/0209678 A1 | 7/2015 | Edwards et al. |
| 2016/0292680 A1 | 10/2016 | Wilson, Jr. et al. |
| 2017/0001115 A1 | 1/2017 | Melinger et al. |
| 2017/0103391 A1 | 4/2017 | Wilson, Jr. et al. |
| 2017/0109955 A1 | 4/2017 | Ernest et al. |
| 2017/0111175 A1 | 4/2017 | Oberhauser et al. |
| 2017/0116693 A1 | 4/2017 | Rae et al. |
| 2017/0124535 A1 | 5/2017 | Juels et al. |
| 2017/0126702 A1 | 5/2017 | Krishnamurthy |
| 2017/0140145 A1 | 5/2017 | Shah |
| 2017/0154331 A1 | 6/2017 | Voorhees |
| 2017/0228731 A1* | 8/2017 | Sheng .................. G06Q 20/401 |
| 2018/0043265 A1 | 2/2018 | Edwards et al. |
| 2018/0089758 A1 | 3/2018 | Stradling et al. |
| 2018/0241546 A1* | 8/2018 | Leng ..................... G06Q 20/027 |
| 2018/0309569 A1 | 10/2018 | Martin et al. |
| 2020/0005254 A1* | 1/2020 | Wright .................. H04L 9/0643 |

OTHER PUBLICATIONS

International Search Report dated Apr. 27, 2018 for PCT/US2018/012286.

* cited by examiner

DIGITAL LEDGER AUTHENTICATION USING ADDRESS ENCODING

RELATED APPLICATIONS

This application claims the benefit of U.S. provisional patent application "Digital Ledger Authentication Using Address Encoding" Ser. No. 62/561,981, filed Sep. 22, 2017.

This application is also a continuation-in-part of U.S. patent application "Competitive Arbitration using Digital Ledgering" Ser. No. 15/861,948, filed Jan. 4, 2018, which claims the benefit of U.S. provisional patent application "Competitive Arbitration using Digital Ledgering" Ser. No. 62/443,086, filed Jan. 6, 2017.

Each of the foregoing applications is hereby incorporated by reference in its entirety.

FIELD OF ART

This application relates generally to authentication and more particularly to digital ledger authentication using address encoding.

BACKGROUND

As the name implies, digital currency is a non-physical currency that is sent and received electronically. As with physical currency, digital currency has units, but unlike a physical currency, the units of digital currency cannot be carried in one's pockets. With digital currency, there are no tangible notes or coinage. Instead, the units of digital currency are stored in a digital account. Digital currencies include virtual currencies and cryptocurrencies. Virtual currencies are typically exchanged between and among members of a virtual community. Virtual currencies are typically controlled by the developers of the virtual currencies. Some virtual currencies can be converted to real or hard currencies such as those currencies issued by nations. Cryptocurrencies are described as a digital asset which can be used as a medium of exchange. The cryptocurrencies are based on cryptography. The cryptography is used to secure transactions involving the cryptocurrencies. Using cryptography, transactions cannot be repeated or deleted. The cryptocurrencies are also based on units of digital currency. Since the value of a cryptocurrency is based on the number of units of the cryptocurrency, cryptography is also used to control creation of additional units of the cryptocurrency. Examples of cryptocurrencies include Bitcoin™, Dash™, Ethereum™, and Monero™, among many others.

Digital currencies, like hard currencies, are used for purchasing goods and services, transferring funds from one person to another, making purchases within certain online communities, among many other. Cryptocurrencies, including decentralized cryptocurrencies, are generated at a rate that is publicly known. The rate of generation of cryptocurrencies is a specific value that was defined at the time of creation of the cryptocurrency. Factors that influence the price and value of a cryptocurrency include the supply of and the demand for the cryptocurrency, public perceptions of the value, innovation, utility of the cryptocurrency, security, and other factors. To date, cryptocurrencies operate independently from centralized banking and economic systems.

Digital currencies, including virtual currencies and cryptocurrencies, have found many applications, some of which are legal and some of which are not. Further, cryptocurrencies have encountered some legal difficulties such as their legal status in some countries. Some countries permit the use of cryptocurrencies for purchasing and selling goods and services, and generally for trade, while other countries limit or altogether ban the use of cryptocurrencies. Cryptocurrencies are at times treated as currencies and at other times as property for purposes of taxation. There are also concerns about the possibility of an economy, potentially a global economy, which is unregulated. Concerns include the use of cryptocurrencies for payments to cyber criminals and other malefactors. Another point of concern is the use of cryptocurrencies in illegal or underground markets such as "Darknet" markets. The "Darknet" markets include online sales of illegal drugs, weapons, stolen goods, and counterfeit goods.

SUMMARY

Disclosed techniques enable digital ledger authentication using address encoding. A digital ledger is a distributed ledger that is based on consensus. A consensus is formed regarding digital data that is replicated, synchronized, and shared, and that is distributed geographically. In order for a distributed ledger to operate successfully, various nodes that participate in the distributed ledger must have access to a peer-to-peer network. In addition, consensus algorithms are used so that the replication of the digital data across participating nodes is performed. The digital ledger can be used to record transactions such as making payments, receiving payments, providing goods or services, receiving goods and services, and so on. The digital ledger ensures that transactions are recorded accurately. The digital ledger further ensures that transactions cannot be repeated, deleted, or altered without notifying the parties involved in the transaction. In addition, the digital ledger can be observed by witnesses who can see the transactions and verify that transactions are justified and accurate.

A digital ledger can be accessed for the purposes of a transaction. The access to the digital ledger can be initiated by a user who wants to purchase an item, to engage with a digital competition platform such as an eSports platform, and so on. The digital ledger can include a digital wallet owned by the user. A wallet address can be determined for a user, where the wallet address is associated with a cryptocurrency in the digital ledger. The wallet address is unique to the user so that transactions initiated by the user are only charged to or credited to that user. The wallet can include one or more cryptocurrencies, where a cryptocurrency can be smart contract-enabled. A digitally mapped value can be encoded based on the wallet address. The digitally mapped value can be determined by hashing the wallet address. The digitally mapped value can be signed using a private key from a digital purveyor. Authentication can occur when the digitally mapped value is reverified using a re-encoding of the wallet address and digital signature. The reverification can enable a predetermined smart contract transaction to take place. If successful, an entry can be appended to the digital ledger, where the entry includes the digitally mapped value. The entry can indicate that a transaction has taken place based on an agreement by the user that certifies the smart contract.

The digital purveyor can provide digital tokens. The digital tokens can be paid for from the user's wallet by using a cryptocurrency. The digital tokens can be used for a variety of purposes, such as accessing a digital competition platform. The digital competition platform can include an eSports platform on which players can participate in a variety of eSports. Active user agreement is required to enable the purchase of digital tokens. To purchase the digital tokens, the user certifies that she or he agrees to stipulations related to the smart contract. The user can certify the smart contract using a variety of techniques, such as selecting check boxes, clicking radio buttons, and typing required words into a web-enabled interface. Other certification techniques may be available. Transaction accuracy is further ensured by re-verifying the digitally mapped value by re-encoding the wallet address. The re-encoding includes matching a private key signature, where the private key signature is based on the private key provided by the digital purveyor. If the reverification is successful, the tokens are purchased. If the reverification is unsuccessful, the transaction is rejected. The rejecting of the transaction can be due to the re-encoding of the wallet address having an incorrect private key signature.

A computer-implemented method for authentication is disclosed comprising: accessing a digital ledger; determining a wallet address for a user, wherein the wallet address is associated with a cryptocurrency in the digital ledger; encoding, using one or more processors, a digitally mapped value based on the wallet address; and appending an entry to the digital ledger, wherein the entry includes the digitally mapped value. Embodiments include a computer program product embodied in a non-transitory computer readable medium for authentication, the computer program product comprising code which causes one or more processors to perform operations of: accessing a digital ledger; determining a wallet address for a user, wherein the wallet address is associated with a cryptocurrency in the digital ledger; encoding a digitally mapped value based on the wallet address; and appending an entry to the digital ledger, wherein the entry includes the digitally mapped value.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
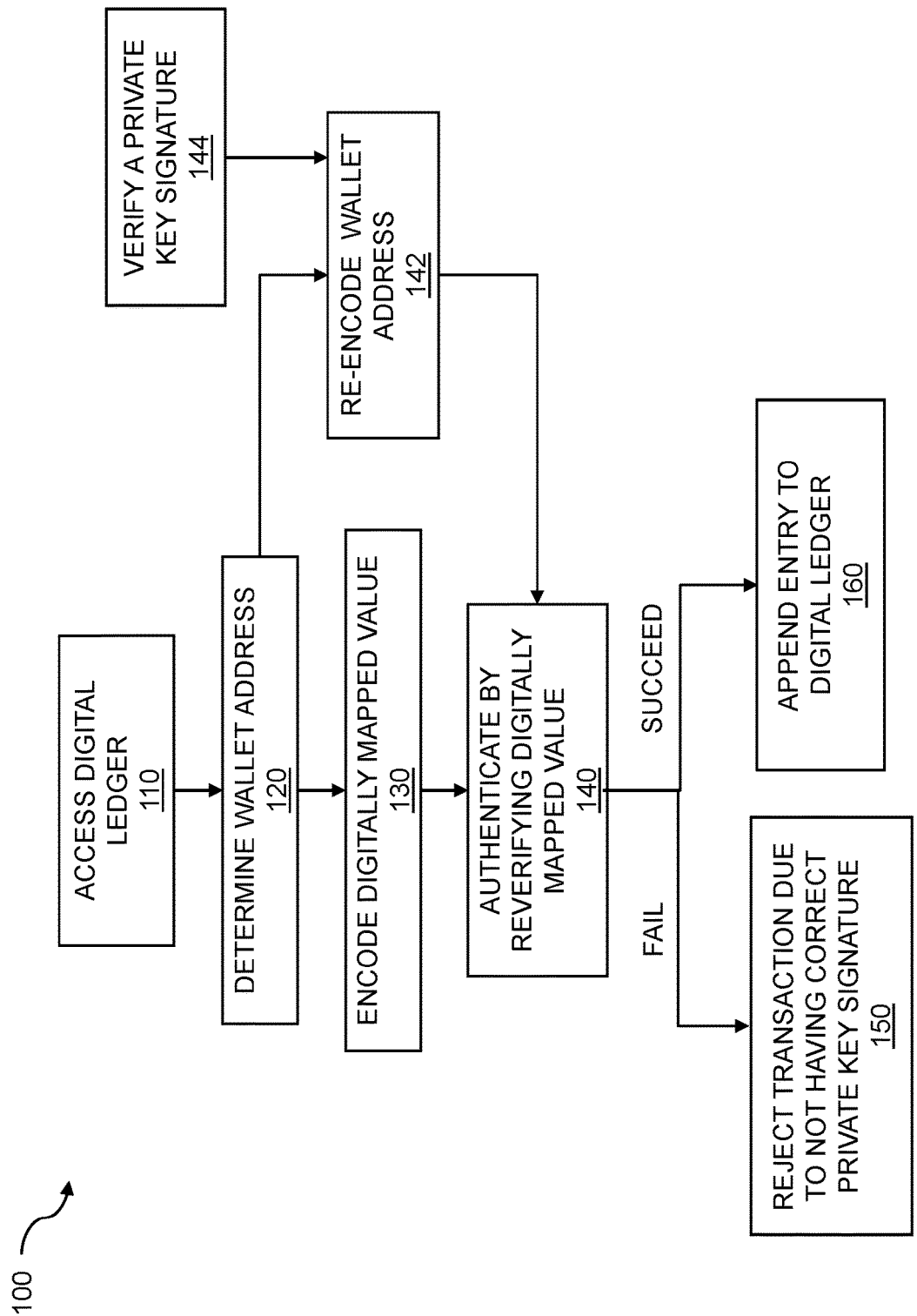
FIG. 1 is a flow diagram for digital ledger authentication.

Disclosed digital ledger authentication uses address encoding to ensure that transactions involving cryptocurrencies are accurately recorded. Digital ledger authentication is a technique that determines whether a user agrees to stipulations relating to a smart contract, and if so, that the user actually receives the goods and services that she or he intended to purchase. A digital ledger is based on a distributed ledger, where the distributed ledger is distributed across multiple processors called nodes. The nodes are distributed geographically. Geographic distribution can include multiple local sites, sites located across the globe, etc. The distributed ledger is replicated on the nodes that support the digital ledger. In order to add or remove items from the digital ledger, consensus must be attained from the nodes that participate in the digital ledger. Consensus is based on examining the digital data that is replicated, shared, and synchronized to the nodes. The nodes of the digital ledger share a peer-to-peer network so that they are able to communicate with the other nodes. The nodes attain an agreement regarding the validity of a transaction using consensus algorithms. The consensus algorithms are used to identify the nodes that require updating and to ensure that the data is successfully replicated across the participating nodes. The digital ledger is used to record a variety of transactions such as making payments, receiving payments, providing goods and services, receiving goods and services, etc. The digital ledger is used to ensure that all transactions are recorded and maintained accurately. The digital ledger further ensures that transactions cannot be repeated, deleted, or altered. If the transactions are repeated, deleted, altered, etc., the parties who are involved in the suspect transaction are notified. Further, the digital ledger can be observed by many witnesses. The witnesses can see the transactions and verify that transactions are justified and accurate. The witnesses may be able to see only the transaction and not the parties participating in the transactions.

A user can choose to engage in a variety of online activities for which the user must make a payment. As mentioned above, the activities can include buying and selling goods and services online, engaging with a digital competition platform, sending money, receiving money, and so on. Each of these activities is considered a transaction in which a digital currency, such as a cryptocurrency, is transferred into or from an account. A user who wishes to engage in a transaction can use a cryptocurrency stored in her or his digital wallet. A digital wallet is a digital entity rather than a physical one. The digital wallet can contain one or more currencies such as cryptocurrencies that can be used for the various types of transactions. To ensure that cryptocurrencies are transferred legitimately, the transactions can be controlled by a smart contract. A smart contract is similar to its antecedent, the paper contract, in that parties agree to take certain actions such as providing goods and services, making payments, and so on. Unlike a paper contract, the user cannot affix his or her written signature to a smart contract. Instead, the user uses techniques appropriate to the digital format. These techniques can include checking a box on a web form, clicking a radio button, entering text such as a unique code or answers to specific questions, and so on. The user can also use a digital signature which is a verifiable string of numbers and characters unique to the user.

Stipulations can be added to enable a smart contract by a digital purveyor. A digital purveyor such as an online seller, an operator of a digital competition platform, etc., can choose to add the stipulations to ensure that the transaction resulting from the smart contract is valid and agreed to by the user. The implementation of the smart contract is the technique that is used to create the transaction. The smart contract may or may not have controls, such as legal controls, to ensure that the user is the legitimate owner of the digital wallet, or other requirements. By adding the stipulations, the digital purveyor can require the user to actively, rather than passively, verify that she or he does want to engage in the smart contract and execute the transaction. The stipulations can include indicating that a user is eighteen years of age or older, that she or he accepts terms and conditions of the smart contract, and so on. With the stipulations actively accepted, the smart contract can be enabled. For example, by the user accepting the stipulations added by a digital purveyor to enable a smart contract, the user can receive tokens that provide access to a digital competition platform.

Other safeguards can be put in place to ensure the validity of a user request for a transaction. The safeguards can be based on reverification of the user by the digital purveyor. Once the user agrees to the stipulations to enable the smart contract, the transaction is reverified. Various techniques can be used for the reverification such as re-encoding the wallet address of the user. The digitally mapped value that results from the re-encoding of the wallet address of the user can be compared to the digitally mapped value previously determined for the user wallet address. In addition to re-encoding the wallet address, the re-encoding includes matching a private key signature. The private key signature is based on the private key provided by the digital purveyor. The private key signature for the smart contract can be compared to the private key signature provided by the digital purveyor. Authentication occurs when both the re-encoding of the wallet address for the user matches the encoded wallet address, and the re-encoding matches a private key signature to the private key signature of the digital purveyor. The authentication is then successful and the transaction proceeds. The transaction fails otherwise.

FIG. 1 is a flow diagram for digital ledger authentication. The digital ledger authentication includes encoding of the address of a digital wallet. The digital wallet can include cryptocurrencies that can be used to purchase tokens, where the tokens can be used to participate in activities including eSports. The flow 100 includes accessing a digital ledger 110. The digital ledger can include one or more digital transactions, where the digital transactions can be based on digital currencies. In embodiments, the digital ledger can comprise a block chain. The digital currencies can include one or more cryptocurrencies. In embodiments, the cryptocurrency includes Ethereum™. The flow 100 includes determining a wallet address 120 for a user, where the wallet address can be associated with a cryptocurrency in the digital ledger. The wallet address for the user can be associated with a variety of digital currencies including the cryptocurrency. The cryptocurrencies can be used to purchase goods and services, to transfer funds from a wallet address to another wallet address, and so on.

The flow 100 includes encoding a digitally mapped value 130 based on the wallet address. Various techniques can be used for the encoding of the digitally mapped value. The encoding can be used to ensure integrity of the data, hide the data, secure the data, and so on. In embodiments, the encoding comprises hashing the wallet address. In embodiments, the encoding can occur on a server for a digital purveyor. The hashing can be performed using a hash function. The hash function can take data of an arbitrary size and convert the data to a fixed-length string. The hash function can be a one-way function, where the fixed-length string to which the arbitrary size data was converted cannot be used to recreate the arbitrary size data. In embodiments, the encoding can further include signing the wallet address that was hashed, where the signing is performed using a private key from a digital purveyor. The digital purveyor can include a certificate authority (CA), a cryptocurrency exchange, an online seller, an operator of an online eSports platform, and so on. In embodiments, the encoding further comprises using a private key to generate the digitally mapped value. The private key is known only to the provider of the private key. The encoding with the private key can be used as part of verifying the validity of the hashed wallet address. The encoding, including the hashing of the wallet address and the signing of the hashed wallet address, can be performed on a server controlled by the digital purveyor. In embodiments, the digitally mapped value is uniquely coded to access the wallet address. A digitally mapped value for a second wallet address is different from the digitally mapped value for the first wallet address.

In embodiments, the digital purveyor provides one or more digital tokens. A digital token can be assigned for encoding the hashed wallet address. The digital token can be unique to the hashed digital wallet address. The digital token can provide access to a digital competition platform such as an eSports platform. The eSports platform can include a distributed eSports platform. The encoding can further comprise enabling a smart contract. The smart contract can be preauthorized to ensure that payment is received, that goods and services are delivered, etc. In embodiments, the encoding can further include obtaining an agreement by the user to enable the smart contract. The agreement by the user can be provided using a variety of techniques such as clicking, entering text, providing biometric data, and so on. The agreement can be reflected in the entry. Obtaining agreement by the user can provide to the user the range of goods and service, access to the digital competition platform, and the like. In embodiments, the agreement is required to purchase digital tokens. The digital tokens can be used for purchasing goods and services, for exchanging digital currencies, for participating in a distributed online eSports platform, etc. In embodiments, the smart contract can be enabled to purchase digital tokens using the cryptocurrency. The cryptocurrency can be obtained from the digital wallet of a user. The agreement by the user can include certifying the smart contract. Some embodiments include enabling a smart contract for a future transaction, wherein the smart contract is associated with the wallet address of a user; preauthorizing the smart contract based on verified input from the user; authenticating payment from the user based on block chain additions; and providing goods to the user in response to the authenticating, wherein the goods are provided by a digital purveyor, and the future transaction is completed in accordance with the smart contract.

As mentioned above, the certifying of the smart contract can be based on the user agreeing to terms for enabling the smart contract. The terms to enable the smart contract can include written stipulations, where the written stipulations can be provided by the digital purveyor. In embodiments, the certifying can include agreeing to specific terms that enable the smart contract. In embodiments, the agreeing to specific terms can include typing required words into a web-enabled interface. The required words can include a randomly generated string unique to the smart contract, answering questions, clicking radio buttons, and so on. In embodiments, the agreeing to specific terms can comprise activating one or more checkboxes within a web-enabled interface. The checkboxes can include text such as, "I have read and understand these terms", "I agree to these terms", and the like. Returning to the smart contract, the smart contract can be used to enable payment, to initiate an exchange, to transact a purchase, to participate in an eSports platform, and so on. In embodiments, the smart contract can include preapproval to send cryptocurrency. The cryptocurrency can include digital currency. The cryptocurrency can include smart contract-enabled cryptocurrency. The cryptocurrency can include Bitcoin™, Litecoin™, Zcash™, Dash™, Ripple™, Monero™, etc. In embodiments, the cryptocurrency includes Ethereum™.

The flow 100 includes authenticating a digital transaction by re-verifying the digitally mapped value 140. The reverifying of the digitally mapped valued can be used to ensure that the digitally mapped value has not been corrupted, damaged, tampered with, and so on. The reverifying of the digitally mapped value is initiated by re-encoding the wallet address 142. The re-encoding the wallet address can be based on using the private key provided by a digital purveyor. The private key can be associated with the digital purveyor. The private key can be associated with the smart contract, the user, the wallet address, and so on. The private key can be associated with a cryptocurrency. The re-encoding can occur on a server for the digital purveyor. The server for the digital purveyor can include a local server, a remote server, a distributed server, a mesh server, a cloud server, and so on. In embodiments, the re-encoding includes verifying a private key signature 144. The preauthorized smart contract has a record of the public key of the digital purveyor. The verifying the private key signature can include algorithmically extracting the public key from the smart contract, which corresponds to the private key used to sign the hashed address. The extracted public key is matched against the stored public key of the digital purveyor. A match verifies that the correct private key must have been used to generate the signature in the first place. In embodiments, the smart contract itself, which has a record of the public address associated with the private key the digital purveyor used to sign the user's hashed wallet address, verifies that the digital purveyor did, in fact, approve that user.

Nonetheless, reverifying the digitally mapped value can succeed or fail. The flow 100 includes rejecting a transaction due to the re-encoding of the wallet address having an incorrect private key signature 150. The reverification can fail, leading to the rejecting. The re-encoding of the wallet address may not have the correct private key signature due to alteration, modification, change, corruption, tampering, etc. The flow 100 includes appending an entry to the digital ledger 160, wherein the entry includes the digitally mapped value. The reverification can succeed, leading to the appending. The digital ledger can include a blockchain. The blockchain can be a digital ledger that supports the recording of a variety of digital transactions such as online transactions enabled by the smart contract. The blockchain records the online transactions as a decentralized digital ledger. The digital ledger can be widely distributed across towns, states, countries, and the globe. The registered transactions are hashed and stored such that the transactions cannot be altered, modified, corrupted, tampered with, etc., after the transactions have been recorded. The hashing and storing secures the registered transactions. A registered transaction is authenticated based on collaboration among systems that support the decentralized digital ledger. Authentication can be based on verifying a hashchain for the transaction. The blockchain is based on a hashchain within a hashchain.

The flow 100 can include a computer-implemented method for authentication comprising: accessing a digital ledger; determining a wallet address for a user, wherein the wallet address is associated with a cryptocurrency in the digital ledger; encoding a digitally mapped value based on the wallet address; and appending an entry to the digital ledger, wherein the entry includes the digitally mapped value. The accessing, determining, encoding, and appending can each be performed by one or more processors. The accessing, determining, encoding, and appending can each be performed by the same one or more processors or different one or more processors. In embodiments, a computer program product is embodied in a non-transitory computer readable medium for authentication, the computer program product comprising code which causes one or more processors to perform operations of: accessing a digital ledger; determining a wallet address for a user, wherein the wallet address is associated with a cryptocurrency in the digital ledger; encoding a digitally mapped value based on the wallet address; and appending an entry to the digital ledger, wherein the entry includes the digitally mapped value. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
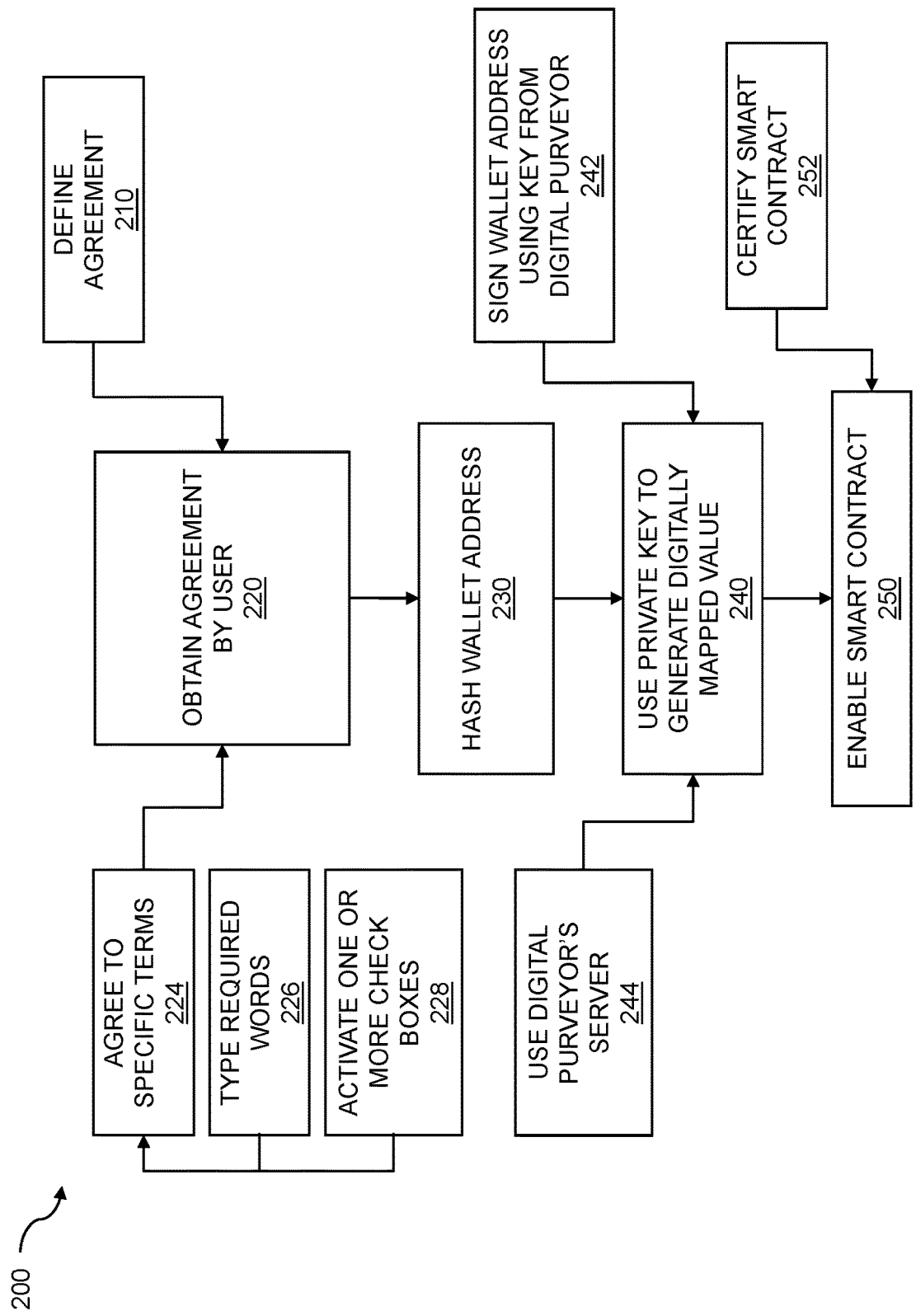
FIG. 2 is a flow diagram for encoding and associated manipulations.

FIG. 2 is a flow diagram for encoding and associated manipulations. Encoding and associated manipulations can support digital ledger authentication using address encoding. A digital ledger is accessed, where the digital ledger can include a blockchain. A wallet address is determined for a user, where the wallet address is associated with a cryptocurrency in the digital ledger. A digitally mapped value is encoded based on the wallet address. The encoding can include hashing the wallet address. The encoding can include signing the wallet address that was hashed, where the signing is performed using a private key from a digital purveyor. The encoding can further comprise using a private key to generate the digitally mapped value. The encoding can further comprise inclusion of a smart contract. An entry is appended to the digital ledger, where the entry includes the digitally mapped value.

The flow 200 includes defining an agreement 210. The agreement can include stipulations that the user must explicitly accept in order to enable a smart contract. The enablement of the smart contract can include certifying the smart contract 252. The certifying can include the user accepting terms for enabling the smart contract. The terms to enable the smart contract can include written stipulations, where the written stipulations can be provided by the digital purveyor. The flow 200 includes obtaining an agreement by the user 220 to enable the smart contract. Obtaining agreement by the user can include agreement by the user to one or more written stipulations. Obtaining agreement by the user can include agreeing to the specific terms that are used in enabling the smart contract 250. Agreement by the user can include the user taking various actions used in agreeing to specific terms 224 of the agreement. The agreeing to specific terms can include typing required words 226 into a web-enabled interface. The typing of required words can include cutting and pasting a one-time use code, answering questions, and so on. The agreeing to specific terms can comprise activating one or more checkboxes 228 within a web-enabled interface. The activating the one or more checkboxes can include typing a character into the checkbox, clicking on the checkbox, clicking on a radio button, etc.

The flow 200 includes hashing the wallet address 230. Hashing the wallet address can be based on a hash function including a cryptographic hash function. A cryptographic hash function can map data of an arbitrary size to a bit string that has a fixed size. The cryptographic hash function can be a one-way function. The flow 200 includes using a private key to generate the digitally mapped value 240. The private key can be obtained from the digital purveyor. In embodiments, the private key is associated with the digital purveyor. The private key can be associated with a private key signature. The flow 200 includes signing the hashed wallet address using a private key from a digital purveyor 242. The digital purveyor can include security a certificate authority (CA), a digital signing authority, an operator of an eSports platform, and so on. The hashing the wallet address 230 and the signing the wallet address using a private key from a digital purveyor can comprise using a private key to generate a digitally mapped value 240, which is based on the wallet address. The encoding a digitally mapped value can be performed using the digital purveyor's server 244. The digital purveyor's server can be a private server, a web-based server, a cloud-based server, and so on. Using the digital purveyor's server ensures that the private key is known only to the digital purveyor.

The flow 200 includes enabling a smart contract 250. The enabling of a smart contract can include the user agreeing to one or more written stipulations. In embodiments, the smart contract can include preapproval to send cryptocurrency, wherein the cryptocurrency is associated with a user's digital wallet, wherein the user's digital wallet is identified by a wallet address. The enabling of the smart contract can comprise certifying the smart contract 252. The certifying can include indicating a user's agreement to the terms of the smart contract. The certifying can include a digitally mapped value that pre-authorizes the smart contract for future execution. In other words, the user is agreeing to a separate set of written stipulations required by the digital purveyor before the user can interact with the smart contract and receive digital tokens. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
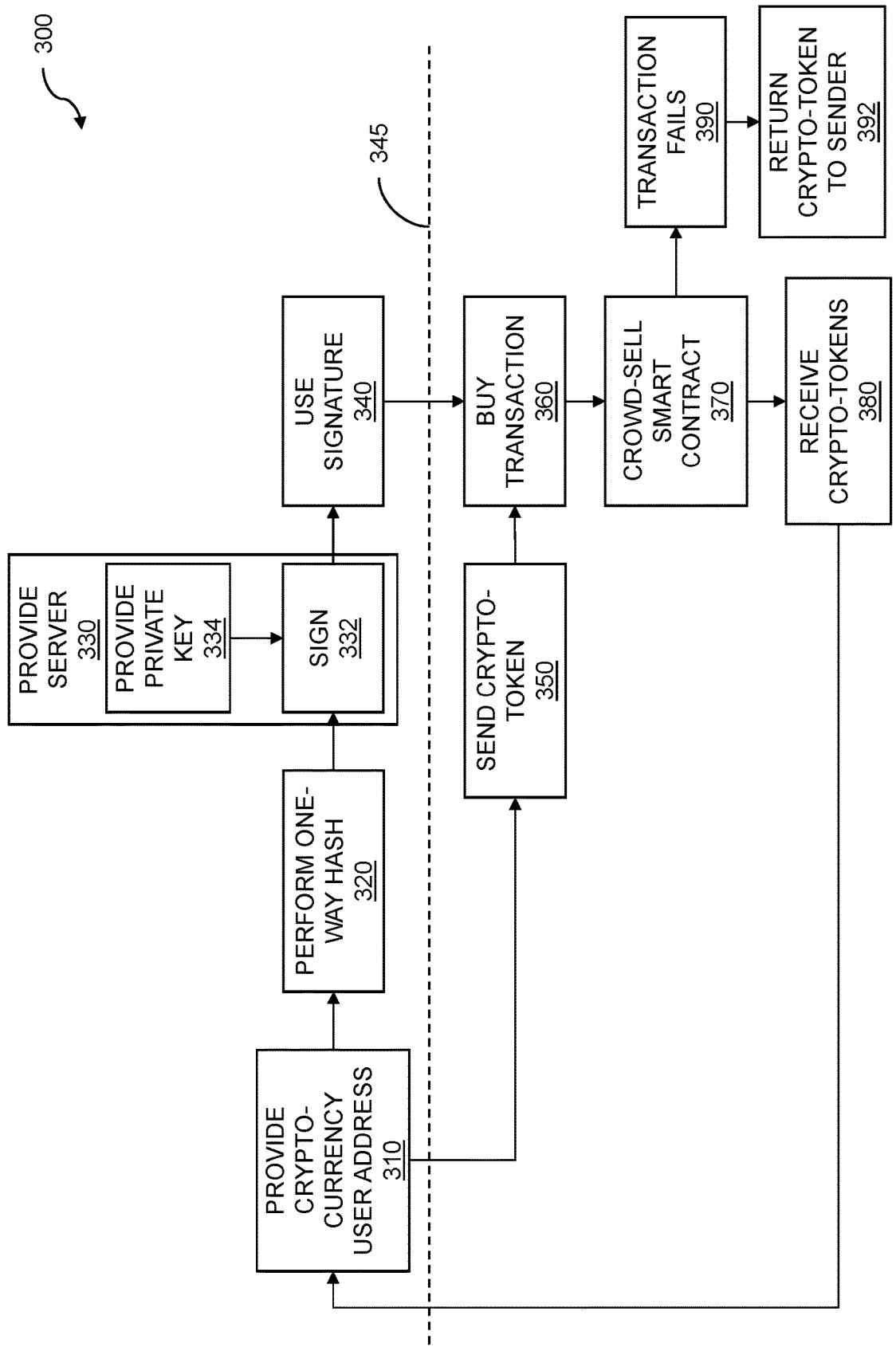
FIG. 3 is a flow diagram for crowd-selling smart contract.

FIG. 3 is a flow diagram for a crowd-selling smart contract. A smart contract can include a distributed digital ledger such as a block chain. A smart contract can be included in encoding a digitally mapped value based on a wallet address. The smart contract can be crowd-sold. A wallet address is determined for a user. The wallet address is associated with a cryptocurrency. A digitally mapped value is encoded based on the wallet address, where the encoding can further include using a private key to generate the digitally mapped value. The private key can be from a digital purveyor. The digitally mapped value is reverified by re-encoding the wallet address. An entry is appended to the digital ledger, where the entry includes the digitally mapped value. A transaction can be rejected due to the re-encoding of the wallet address having an incorrect private key signature, based on non-authentication of the digitally mapped value.

Crowd-selling is a funding model in which a prototype good or service is offered for free in return for a donation made to the one who is offering the prototype good or service. The donations received are used to complete development of the good or service, to buy manufacturing services, and so on. The donor can receive the prototype or "free perk" when production begins. The level of the perk can be based on the level of the donation made. If insufficient funds for development, manufacturing, etc. are received, then the free perks are not distributed to the donors. Examples of online crowd-selling sites include Kickstarter™, GoFundMe™, Indiegogo™, etc. A digital purveyor can provide the crowd-selling.

The flow 300 can include providing a cryptocurrency user address 310. The user address can include a cryptocurrency account, a digital wallet, and so on. The flow 300 includes performing a one-way hash 320 of the cryptocurrency user address. The one-way hash can include encoding the cryptocurrency user, or digital wallet, address. In embodiments, the encoding comprises hashing the wallet address. The results of the encoding can include a digitally mapped value.

The flow 300 includes providing a server 330 to continue the encoding of the digitally mapped value. The server 330 can sign 332 the digitally mapped value. Embodiments include signing the wallet address that was hashed, where the signing is performed using a private key 334 from a digital purveyor. The private key can be known only to the digital purveyor. In embodiments, the performing a one-way hash 320 and the signing 332 are performed on the same server. The flow 300 includes enabling the smart contract by using the signature 340. The smart contract is thus preauthorized for a later transaction. The later transaction can occur almost immediately after the preauthorization or at a significantly later time, such as a week or two later when a crowd sale occurs. The steps in flow 300 occurring above dotted line 345 can therefore occur during the initial, preauthorizing phase of the digital ledger authentication.

The flow 300 includes steps shown below dotted line 345, which can occur after a preauthorization of a smart contract occurs. The flow 300 includes sending a crypto-token 350. The crypto-token can include a digital token. The digital token can be provided by a digital purveyor. In embodiments, the digital purveyor can provide digital tokens. A digital token can be used to purchase goods and services, to exchange funds, and so on. In embodiments, one or more digital tokens provide access to a digital competition platform, such as an eSports platform. The flow 300 includes executing a buy transaction 360. A transaction can include obtaining an agreement by the user to enable a smart contract. Agreement can include checking a box, clicking a radio button, entering text into a field of a web form, and so on. The transaction can include purchasing the crypto-token. In embodiments, the agreement can be required to purchase the one or more digital tokens. The purchasing of the one or more crypto-tokens can be performed using a variety of techniques. In embodiments, the smart contract is enabled to purchase digital tokens using the cryptocurrency. In embodiments, the buying a transaction 360 includes reverification of the signature sent with the transaction request. In embodiments, after a smart contract-encoded start time, the user can send cryptocurrency and the preauthorization signature and receive digital tokens.

The flow 300 includes crowd-selling the smart contract 370. The crowd-selling can include crowd approval of the smart contract, crowd purchasing of digital tokens, and so on. The flow 300 includes receiving crypto-tokens 380. Cryptocurrency from the user address such as the digital wallet are used to pay for the crypto-tokens, and the crypto-tokens are transferred to the cryptocurrency user address 310. The flow 300 includes handling of failed transactions 390. A transaction can fail due to re-encoding of the wallet address not having a correct private key signature. The transaction can fail due to a failure of crowd-selling. The flow 300 includes returning the crypto-token to the sender 392. Since no cryptocurrency was exchanged to pay for the crypto-token, then the crypto-token can be returned to the owner of the crypto-token. The owner of the crypto-token can include a digital purveyor. In embodiments, all of the steps in the flow 300 can be implemented on, or enabled by, a server 330. Various steps in the flow 300 may be changed in order, repeated, omitted, or the like without departing from the disclosed concepts. Various embodiments of the flow 300 can be included in a computer program product embodied in a non-transitory computer readable medium that includes code executable by one or more processors.

Figure 4:
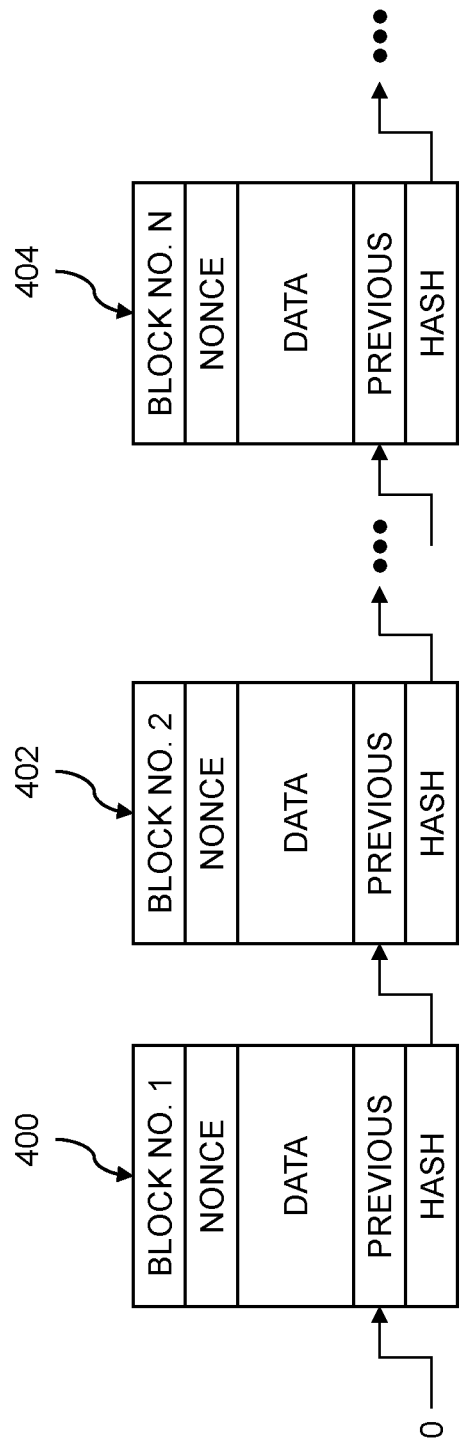
FIG. 4 illustrates a blockchain.

FIG. 4 illustrates a blockchain. A digital ledger can include a blockchain. Digital ledger authentication can be based on using address encoding. A digital ledger is accessed, where the digital ledger can include a blockchain. A wallet address is determined for a user, where the wallet address is associated with a cryptocurrency in the digital ledger. A digitally mapped value is encoded based on the wallet address. The encoding can include hashing the wallet address. The encoding can include signing the wallet address that was hashed, where the signing is performed using a private key from a digital purveyor. The encoding can further comprise using a private key to generate the digitally mapped value. The encoding can further comprise inclusion of a smart contract. An entry is appended to the digital ledger, where the entry includes the digitally mapped value.

Online transactions can be secured by using a blockchain. A blockchain is a digital ledger that supports the recording of digital transactions such as online transactions. The blockchain records the online transactions as a decentralized digital ledger. The digital ledger is widely distributed, where the wide distribution can include global distribution. The registered transactions are hashed and stored such that the transactions cannot be altered, modified, changed, corrupted, tampered with, etc., after the transactions have been recorded, thus securing the registered transactions. Veracity of a registered transaction is authenticated based on collaboration among systems that support the decentralized digital ledger. The authentication is based on verifying a hashchain for the transaction. The blockchain is based on a hashchain within a hashchain.

A blockchain can include two types of records. The blockchain records can include blocks and transactions. A block can include transactions, where the transactions have been determined to be valid. The blocks can be organized into a Merkle tree, which will be discussed in greater detail later. The Merkle tree can be formed based on hashing the transactions and encoding the hashed transactions. A block in the blockchain includes a hash of the previous block in the blockchain. A blockchain can resemble a linked list in that the blocks of the chain are linked together. The notable difference between a linked list and a blockchain is that the reference to the previous block is not a pointer but rather a hash. Adding blocks to the blockchain is an iterative technique. The hash of the current block depends on the hash of the previous block, the hash of the previous block in the chain depends on the hash of the previous block to that block, and so on. A result of the iterative technique is that the blockchain is that data stored in a blockchain can be considered secure. An example of security of data stored in a blockchain is digital currency. Since each block in a blockchain depends on hashes that are based on previous blocks in the blockchain, then a change of data in one block of the blockchain invalidates the hashes of all subsequent blocks in the blockchain. Digital currency can be spent once and cannot be infinitely reproduced and/or spent. That is, a transaction that shows that a particular unit of digital currency was used in an exchange creates a hash. If the unit of digital currency were to be used again, then the hash generated by the new transaction would invalidate all subsequent blocks in the blockchain, indicating that an attempt was made to reuse the unit of digital currency.

At times, validation can occur concurrently for separate blocks. The result of concurrent validation can be to create a fork, where the fork can remain temporarily. Recall that the blockchain is a distributed digital ledger that can be distributed widely across computer systems. The temporary fork can result in multiple histories of the blockchain since updates to the blockchain might not have completely disseminated across the distributed digital ledger. Algorithms, code segments, apps, applications, programs, etc. can be used to score the various versions of the history of the blockchain. Versions of history of the blockchain that score the highest can be chosen over versions of the history of the blockchain with lower scores. The lower scored versions of the history might not be selected for inclusion in the blockchain. These versions that are not selected for inclusion are called orphan blocks. Decisions about which histories of the blockchain score the highest are determined by peers in the distributed digital ledger. The peers use a particular algorithm, code segment, etc. to determine the scoring.

Updates to the blockchain are distributed across the peers. A peer can receive a version of the history of the blockchain with a higher score. The higher score can be due to a block being added to the blockchain. The peer can add the new block to the version of the blockchain stored by the peer, overwrite the existing version of the blockchain, etc. A new score can be determined. The peer can retransmit the improved blockchain to their peers.

A blockchain is shown in FIG. 4. The blockchain includes a first block, block 1 400, a second block, block 2 402, and an Nth block, block N 404. While three blocks are shown, in practice any number of blocks can be included in the blockchain. In practice, the number of blocks in the blockchain continues to increase. A block such as the block 400 includes a block number, a nonce, data, a hash received from the previous block, and a hash generated for this block. Since the block 400 is the first block in the blockchain, there is no previous block. For this first block of the blockchain, the hash from the previous block is zero. The nonce is a "onetime" value that is determined for the block. The nonce is a value that is determined based on the data, the previous hash, the hash for the current block, etc. If any information in the block were to be changed, such as information, the data, the previous hash, the block hash, etc., then the nonce value is no longer valid for the block. The nonce can be used to indicate that the block has been tampered with, corrupted, or otherwise changed. If there is a valid reason to change a value in the block, such as updating the data in the block, then a new nonce value is calculated. Determination of the new nonce value can be based on the hash for the block or other criteria. Subsequent blocks in the blockchain, such as the block 2 402 and the block N 404, contain fields similar to those fields of the first block 400. The previous hash value of the block 402 is set to the hash value of the block 400. The previous hash value of the block 404, block N, is set to the hash value for a block N−1 (not shown).

A change of value in one block of a blockchain causes the validity of all subsequent blocks to be negated. The invalidity of all subsequent blocks results from the hash of a given block being dependent on the hash of a previous block. That is, even though data in a given block such as the block 402 has not changed, the validity of the block 402 was based on the validity of its previous block, 400. If the data in the block 400 were to be changed, and the nonce not updated, then the block 402 is no longer valid since the hash for the block 400 changes. Since the validity of a given block depends on the validity of previous blocks, then the block 404 becomes invalid, and so on. By looking at any block in the blockchain, it can be determined whether the data in that block is valid. If the data in the block 400 were changed legitimately, then a new nonce value can be generated to revalidate the block 400. The result of regenerating the nonce value for the block 400 is that all subsequent blocks in the blockchain can remain valid.

Figure 5:
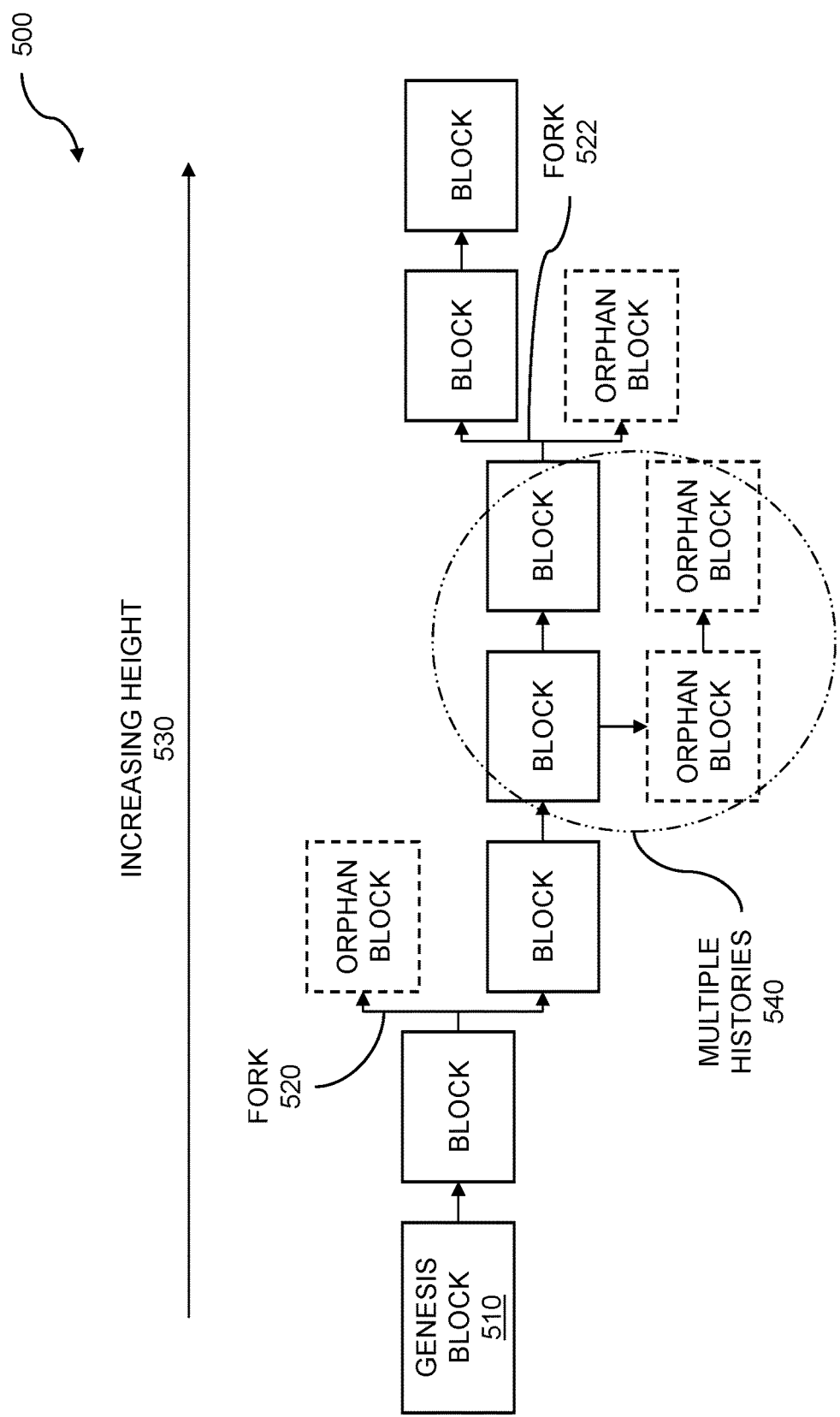
FIG. 5 illustrates a blockchain over time.

FIG. 5 illustrates a blockchain over time. A digital ledger can include a blockchain. Digital ledger authentication can use address encoding. A wallet address is determined for a user. The wallet address is associated with a cryptocurrency. A digitally mapped value is encoded based on the wallet address, where the encoding can further include using a private key to generate the digitally mapped value. The private key can be from a digital purveyor. The digitally mapped value is reverified by re-encoding the wallet address. An entry is appended to the digital ledger, where the entry includes the digitally mapped value. A transaction can be rejected due to the re-encoding of the wallet address not having a correct private key signature.

Online transactions can be secured by using a blockchain. A blockchain is a digital ledger that supports the recording of digital transactions such as online transactions. The blockchain records the online transactions as a decentralized digital ledger. The digital ledger is widely distributed, where the wide distribution can include global distribution. The registered transactions are hashed and stored such that the transactions cannot be altered, modified, changed, corrupted, tampered with, etc., without detection after the transactions have been recorded, thus securing the registered transactions. Veracity of a registered transaction is authenticated based on collaboration among systems that support the decentralized digital ledger. The authentication is based on verifying a hashchain for the transaction. The blockchain is based on a hashchain within a hashchain.

The illustration 500 shows a blockchain including a genesis block 510 that forms the root of a blockchain. Blocks can be added to the blockchain over time. The addition of blocks can be described as increasing the height 530 of the blockchain. Addition of a new block to the blockchain can be based on validation. Recall that the blockchain is a distributed digital ledger. At times, validation can occur concurrently for separate blocks. The result of concurrent validation can be to create a fork such as a fork 520 and a fork 522, where the fork can remain temporarily. The temporary fork can result in multiple histories of the blockchain, such as multiple histories 540. The multiple histories can occur since updates to the blockchain might not have completely disseminated across the distributed digital ledger. The various versions of the histories of the blockchain are scored, as described elsewhere. The versions of history of the blockchain that score the highest can be chosen over versions of the history of the blockchain with lower scores. The lower scored versions of the history might not be selected for inclusion in the blockchain and are orphaned, as shown in the illustration 500 by the orphan blocks. Decisions about which histories of the blockchain score the highest are determined by peers in the distributed digital ledger. Updates to the blockchain are distributed across the peers. A peer can receive a version of the history of the blockchain with a higher score. The higher score can be due to a block being added to the blockchain. The peer can add the new block to the version of the blockchain stored by the peer, overwrite the existing version of the blockchain, etc. A new score can be determined. The peer can retransmit the improved blockchain to its peers.

Figure 6:
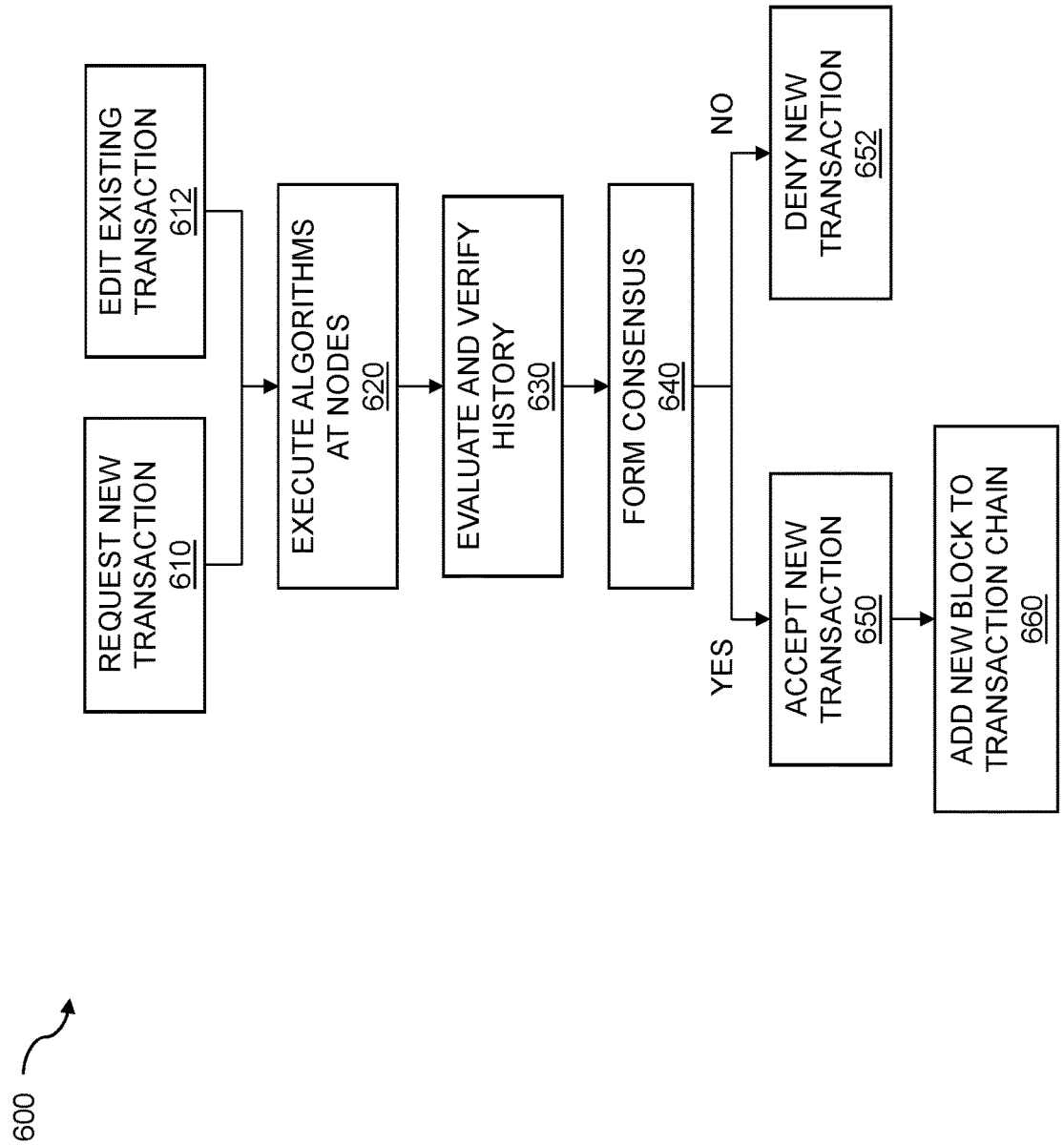
FIG. 6 is a flow diagram for handling transactions.

FIG. 6 is a flow diagram for handling transactions. Transaction handling can be used for digital ledger authentication using address encoding. A digital ledger is accessed, where the digital ledger can include a blockchain. A wallet address is determined for a user, where the wallet address is associated with a cryptocurrency in the digital ledger. A digitally mapped value is encoded based on the wallet address. The encoding can include hashing the wallet address. The encoding can include signing the wallet address that was hashed, where the signing is performed using a private key from a digital purveyor. The encoding can further comprise using a private key to generate the digitally mapped value. The encoding can further comprise inclusion of a smart contract. An entry is appended to the digital ledger, where the entry includes the digitally mapped value.

Online transactions can be secured by using a blockchain. A blockchain is a digital ledger that supports the recording of digital transactions such as online transactions. The blockchain records the online transactions as a decentralized digital ledger. The digital ledger is widely distributed, where the wide distribution can include global distribution. The registered transactions are hashed and stored such that the transactions cannot be altered, modified, changed, corrupted, tampered with, etc., after the transactions have been recorded, thus securing the registered transactions. Veracity of a registered transaction is authenticated based on collaboration among systems that support the decentralized digital ledger. The authentication is based on verifying a hashchain for the transaction. The blockchain is based on a hashchain within a hashchain.

The flow 600 includes requesting a new transaction 610. A new transaction can include starting a new blockchain where the new transaction can represent the first or root block of the blockchain. The new transaction can include adding a transaction to an existing block chain. The new transaction can include adding a new block to the blockchain based on a time, such as adding a block every five minutes, for example. The new transaction can include receiving an updated block chain from a peer in a distributed digital ledger. The flow 600 includes editing an existing transaction 612. A block in the blockchain can be edited for a variety of purposes such as updating, modifying, correcting, or otherwise changing the contents of a block. A block in the blockchain could be updated to correct a data corruption event. As discussed elsewhere, editing a transaction, data, a block, etc., can require determining a new nonce value for the block that is to be edited.

The flow 600 includes executing algorithms at nodes 620. An algorithm, code segment, app, application, program, etc., can be executed at a node based on a request for a new transaction. The algorithm, code segment, etc., can be used to process data as part of a cipher chain. The flow 600 includes evaluating and verifying a history 630 of a blockchain. Recalling the discussion of a blockchain and its formation, one notes that a block in the blockchain includes a label or number, a nonce, data, a previous hash, and a hash generated for the current block based on the other block information. Since the hash for a block in the blockchain is computed based on the hash from the previous block, the determination of the hash for the current block is iterative. One unauthorized change in a block earlier in a blockchain invalidates not only the block in which the unauthorized change was made but also all subsequent blocks. Evaluation and verification of the history of a block can ensure the veracity of the block, the blockchain, etc.

The flow 600 includes forming a consensus 640. Each node that is included in a distributed digital ledger includes a copy of the blockchain. The nodes can be distributed geographically. Each node, having evaluated and verified the history of its copy of the blockchain, forms a score for a request for a new transaction. The nodes collaborate to form a consensus on whether to allow the transaction. The collaboration among nodes can include collective self-interest. The collaboration among the nodes can support high confidence in data security, integrity, and so on. If the consensus formed from the evaluation and verification by the nodes is "no", then the new transaction is denied 652. If the consensus formed from the evaluation and verification by the nodes is "yes", then the new transaction is accepted 650. The flow 600 includes adding a new block to the transaction chain 660. Adding a new block to the transaction chain includes obtaining the hash from the previous block; obtaining the transaction, data, etc. for the new block; and generating a hash for the current (new) block. The new block can then be added to the blockchain. As described elsewhere, the addition of the new block can be distributed to the peers that are included in the distributed digital ledger. The new block can be added to the blockchains at the peers, the updated blockchain can overwrite the blockchain existing at the peers, etc. Various steps in the flow 600 may be changed in order, repeated, omitted, or the like without departing from the disclosed concepts. Various embodiments of the flow 600 can be included in a computer program product embodied in a non-transitory computer readable medium that includes code executable by one or more processors.

Figure 7:
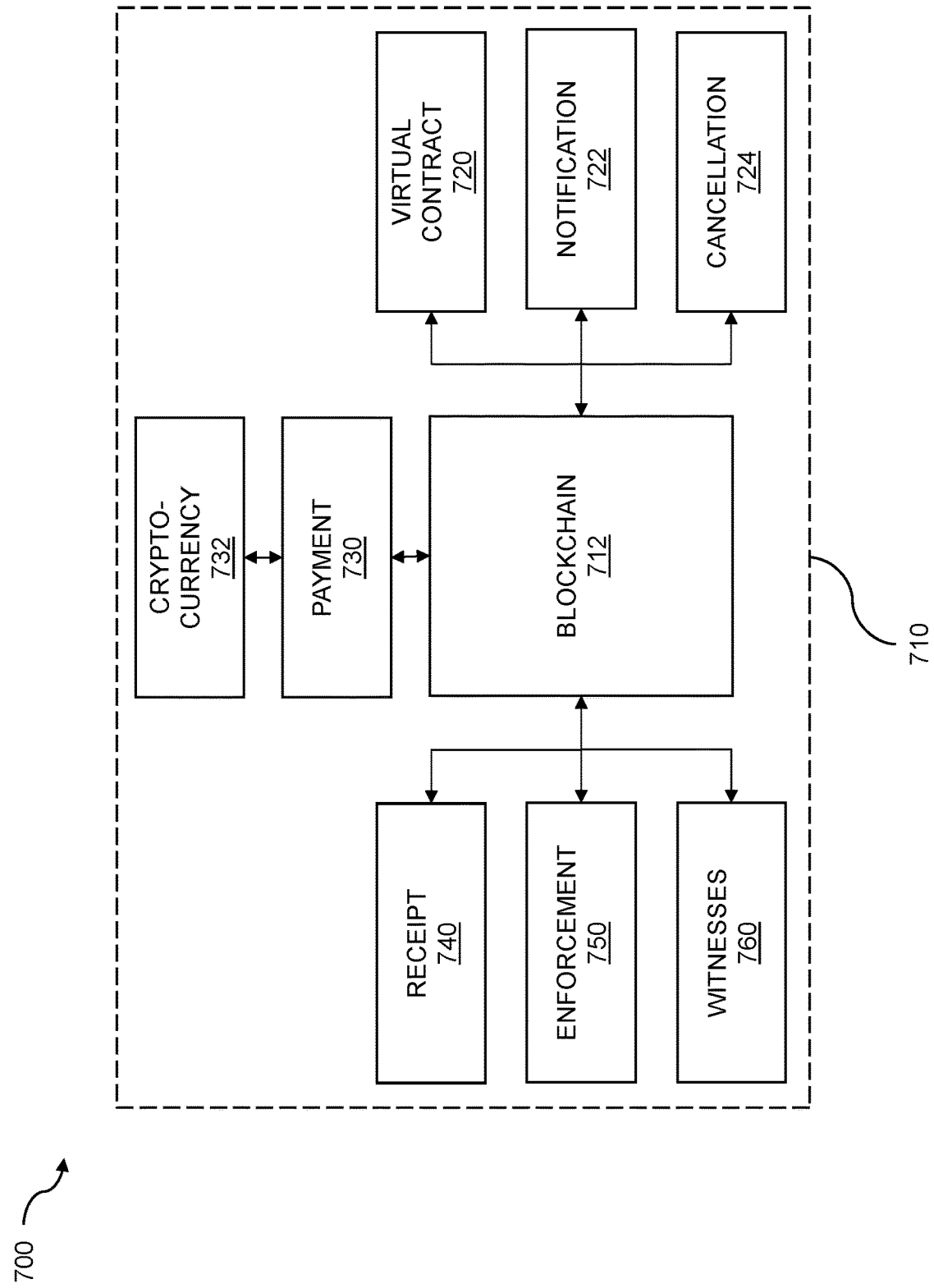
FIG. 7 shows elements of a smart contract.

FIG. 7 shows elements of a smart contract. A smart contract can be used for digital ledger authentication using address encoding. A digital ledger such as a blockchain is accessed. A wallet address is determined for a user. The wallet address is associated with a cryptocurrency. A digitally mapped value is encoded based on the wallet address, where the encoding can further include using a private key to generate the digitally mapped value. The private key can be from a digital purveyor. The digitally mapped value is reverified by re-encoding the wallet address. An entry is appended to the digital ledger, where the entry includes the digitally mapped value. A transaction can be rejected due to the re-encoding of the wallet address having an incorrect private key signature.

In FIG. 7, elements of a smart contract are shown 700. A smart contract 710 can be based on a digital ledger. In embodiments, the digital ledger comprises a blockchain 712. A blockchain can include two types of records, where the blockchain records can include blocks and transactions. A given block in the blockchain can include transactions, where the transactions have been determined to be valid. A transaction can be based on enabling a virtual contract 720. The virtual contract 720 can include a digital contract. The virtual contract can include notification 722. A notification 722 can occur when the virtual contract has been changed, the virtual contract has been enabled, the virtual contract has expired, and so on. The virtual contract 720 can include cancellation 724. Cancellation of the virtual contract such as a digital contract can occur due a failure of any parties involved in the virtual contract to meet their obligations as described in the virtual contract. A transaction can include a payment 730. The payment 730 can be based on a digital currency such as a cryptocurrency 732. The cryptocurrency can include Ethereum™. The payment can be collected from a user, remitted to a user, remitted to digital purveyor, and so on. The payment can be made by the user to purchase digital tokens from the digital purveyor.

The smart contract 710 can include a receipt 740. The receipt 740 can be recorded in the blockchain 712. The receipt can be used to show a given transaction in the blockchain 712. The smart contract 710 can include enforcement 750. Enforcement 750 of the smart contract 710 can include collecting funds from a buyer, providing funds to a seller, collecting a good or a service from the seller, providing a good or a service to the buyer, and so on. Enforcement can include penalties when there is a cancellation 724 of the virtual contract. Transactions recorded in the blockchain 712 can be observed by witnesses 760. Witnesses can see transactions, vote on the validity of transactions, arbitrate disputes relating to transactions, and so on. The witness may not be able to determine the identities of any parties involved in the smart contract.

Figure 8:
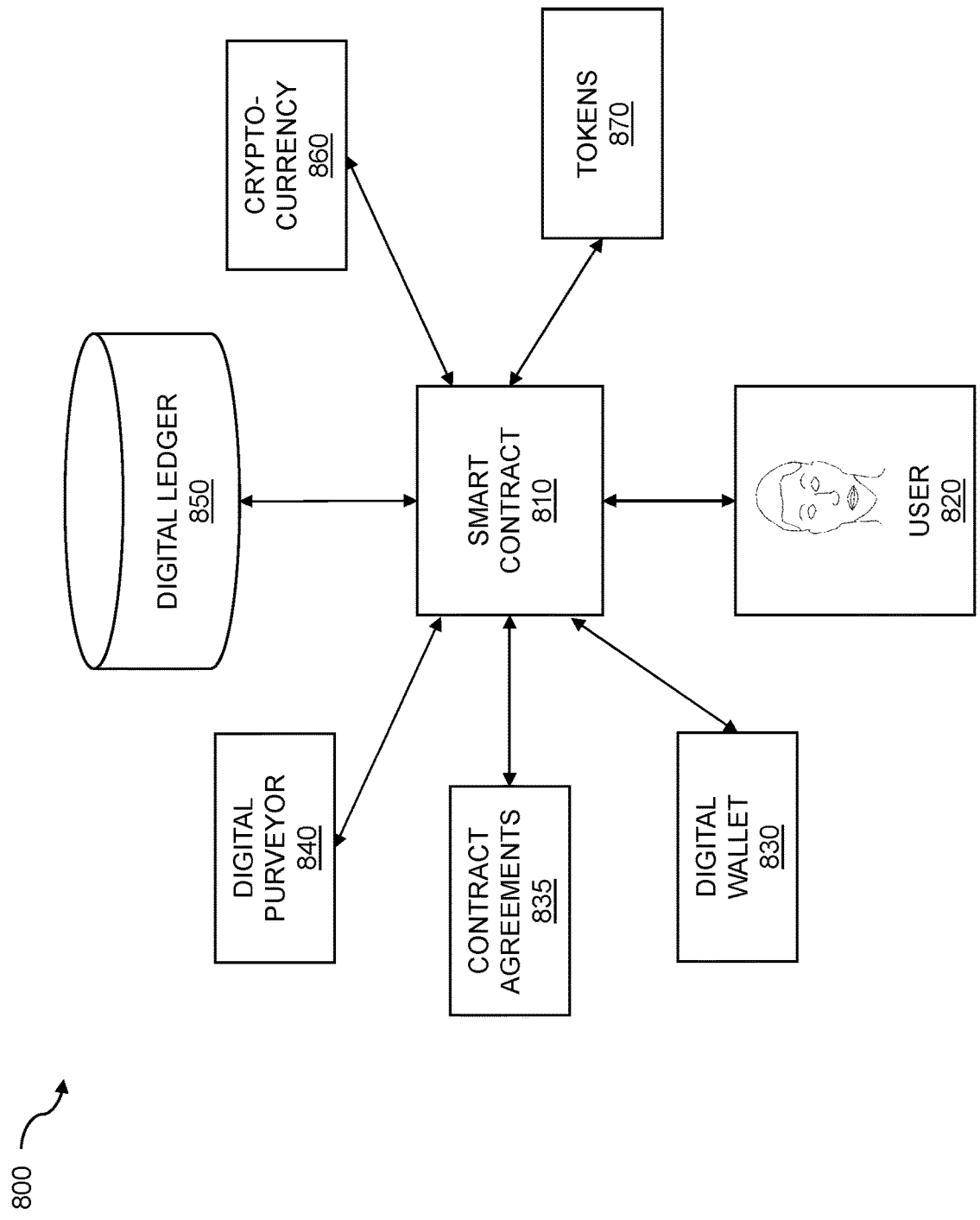
FIG. 8 illustrates a block diagram of smart contract usage.

FIG. 8 illustrates a block diagram of smart contract usage 800. A smart contract can be used for digital ledger authentication using address encoding. A digital ledger is accessed, where the digital ledger can include a blockchain. A wallet address is determined for a user, where the wallet address is associated with a cryptocurrency in the digital ledger. A digitally mapped value is encoded based on the wallet address. The encoding can include hashing the wallet address. The encoding can include signing the wallet address that was hashed, where the signing is performed using a private key from a digital purveyor. The encoding can further comprise using a private key to generate the digitally mapped value. The encoding can further comprise inclusion of a smart contract. An entry is appended to the digital ledger, where the entry includes the digitally mapped value.

As discussed previously, the encoding of a digitally mapped value can further comprise inclusion of a smart contract 810. The smart contract can be used to exchange one or more digital currencies such as cryptocurrencies. The smart contract 810 can be enabled by agreeing to one or more written stipulations. The stipulations can include checking a box, clicking a radio button, entering text into a web form, and so on. The user 820 can be required to accept, or agree to, the one or more stipulations. Upon accepting the one or more stipulations of the smart contract, the smart contract can be enabled. A user 820 can interact with a smart contract 810. The smart contract 810 can access a digital wallet 830. The digital wallet 830 can belong to the user 820. The digital wallet 830 can include a wallet address. The wallet addresses can be hashed. The digital wallet can include one or more cryptocurrencies owned by the user 820. The cryptocurrency can include Ethereum™. The smart contract 810 can be enabled by contract agreements 835. The contract agreements 835 can be stipulations and terms that the user 820 explicitly accepts in order to enable the smart contract 810.

The smart contract 810 can be established by a digital purveyor 840 for use in a digital transaction. The digital transaction can be one that is in the process of being executed, such as a real time or near real time transaction, or it can be one that is executed in the future, such as a crowd-sell event that may take place one week in the future. The smart contract 810 can be enabled by a digital signature obtained using a private key from a digital purveyor 840. The digital signature can verify a hashed wallet address for digital wallet 830 or user 820. Embodiments include signing the wallet address that was hashed, where the signing can be performed using the private key from the digital purveyor. The signing can include a digital signature. The smart contract 810 can be authenticated using a digital ledger 850. The digital ledger 850 can be used for recording various transactions, including transactions related to digital currencies such as cryptocurrencies. The smart contract 810 can include accepting one or more cryptocurrencies 860. The cryptocurrencies 860 can be transferred into the digital wallet 830, out of the digital wallet, to the digital purveyor, and so on. The smart contract 810 can include providing tokens 870. Tokens 870 can be purchased by the user 820, where the tokens can be provided by the digital purveyor 840. The smart contract 810 can be preapproved for the user 820 to purchase tokens 870 from the digital purveyor 840 using cryptocurrency 860 from the digital wallet 830 when enabled by contract agreements 835 and recorded in a digital ledger 850. The digital tokens can be used for a variety of purposes including participating in eSports.

Figure 9:
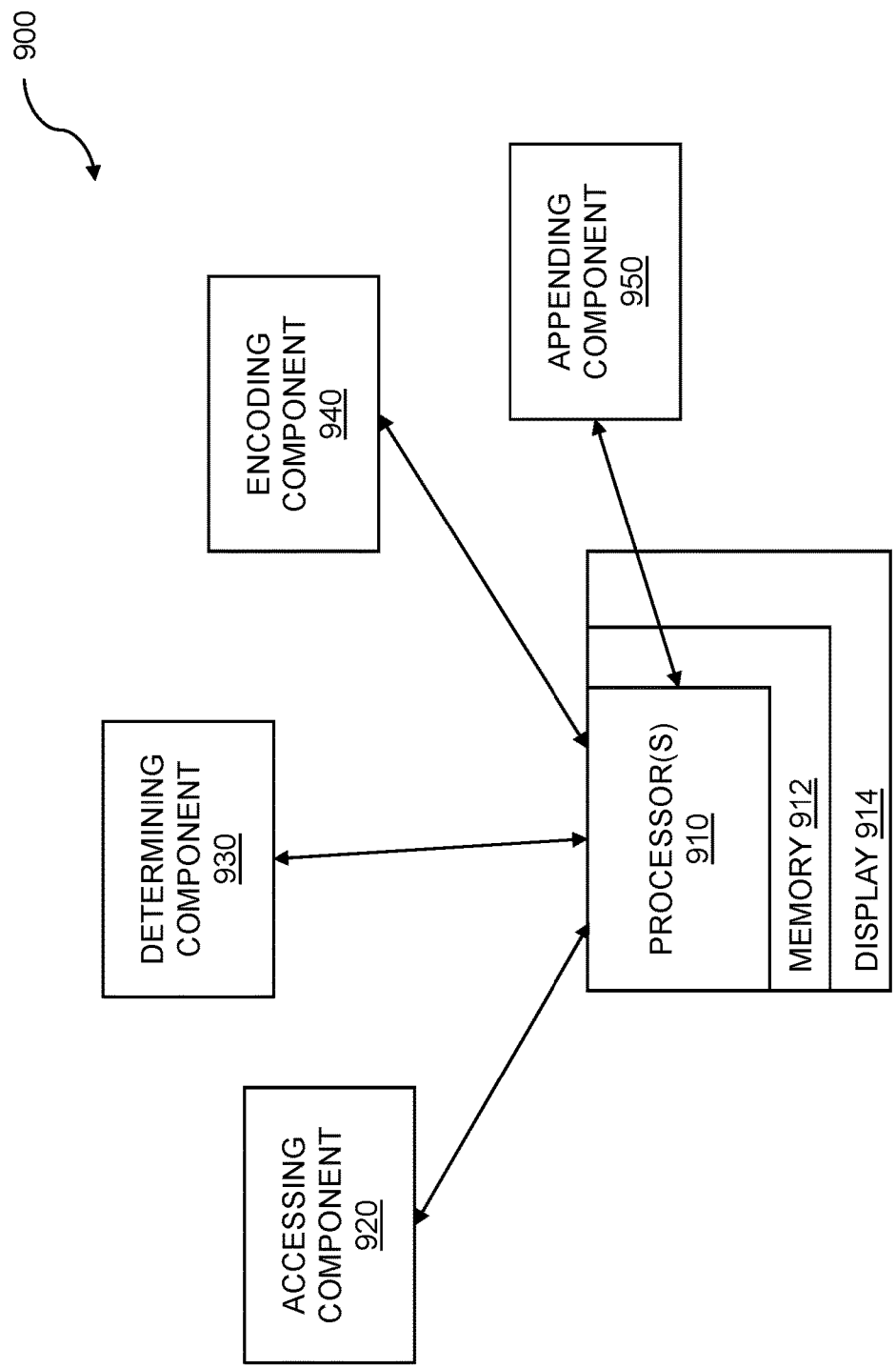
FIG. 9 is a system diagram for authentication.

FIG. 9 is a system diagram for authentication. A system 900 can include one or more processors 910 connected to a memory 912 and a display 914. The system 900 can include an accessing component 920, a determining component 930, an encoding component 940, and an appending component 950. The system 900 can comprise a digital ledger authentication platform. The accessing component 920 can comprise accessing a digital ledger. The digital ledger can comprise a blockchain. A blockchain can include an expanding list of blocks that are cryptographically secured and linked. The determining component 930 can comprise determining a wallet address for a user, where the wallet address is associated with a cryptocurrency in the digital ledger. The user can include a participant in a smart-contract. The smart-contract can be enabled by terms and conditions for purchasing tokens with which to pay for participation in an online eSport. The encoding component 940 can comprise encoding a digitally mapped value based on the wallet address. The encoding can include hashing the wallet address. The encoding can include signing the wallet address that was hashed, where the signing is performed using a private key from a digital purveyor. The encoding can include using a private key to generate the digitally mapped value. The encoding can further comprise inclusion of a smart contract. The encoding can include obtaining an agreement by the user to enable the smart contract. The encoding can include re-encoding, where the re-encoding can include matching a private key signature.

The appending component 950 can comprise appending an entry to the digital ledger, wherein the entry includes the digitally mapped value. The digitally mapped value can include a transaction including a cryptocurrency. The transaction can be based on reverifying the digitally mapped value by re-encoding the wallet address. The transaction can be rejected due to the re-encoding of the wallet address having an incorrect private key signature. Thus, disclosed is a computer system for authentication comprising: a memory which stores instructions; one or more processors attached to the memory wherein the one or more processors, when executing the instructions which are stored, are configured to: access a digital ledger; determine a wallet address for a user, wherein the wallet address is associated with a cryptocurrency in the digital ledger; encode a digitally mapped value based on the wallet address; and append an entry to the digital ledger, wherein the entry includes the digitally mapped value. Disclosed embodiments can include a computer program product embodied in a non-transitory computer readable medium for authentication, the computer program product comprising code which causes one or more processors to perform operations of: accessing a digital ledger; determining a wallet address for a user, wherein the wallet address is associated with a cryptocurrency in the digital ledger; encoding a digitally mapped value based on the wallet address; and appending an entry to the digital ledger, wherein the entry includes the digitally mapped value.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for authentication comprising:
   accessing a digital ledger;
   determining a wallet address for a user, wherein the wallet address is associated with a cryptocurrency in the digital ledger;
   encoding, using one or more processors, a digitally mapped value based on the wallet address, wherein the encoding further comprises inclusion of a smart contract and wherein the encoding comprises obtaining an agreement by the user to enable the smart contract;
   obtaining an agreement by the user to enable the smart contract, wherein the agreement includes certifying the smart contract, wherein the certifying includes agreeing to specific terms that enable the smart contract, and wherein the agreeing to specific terms includes typing required words into a web-enabled interface;
   appending an entry to the digital ledger, wherein the entry includes the digitally mapped value;
   crowd-selling the smart contract; and
   transferring cryptocurrency from the crowd-selling of the smart contract using the wallet address that was encoded.

2. The method of claim 1 wherein the encoding comprises hashing the wallet address.

3. The method of claim 2 wherein the encoding further comprises signing the wallet address that was hashed, wherein the signing is performed using a private key from a digital purveyor.

4. The method of claim 1 wherein the agreement is required to purchase digital tokens.

5. The method of claim 1 wherein the smart contract is enabled to purchase digital tokens using the cryptocurrency.

6. The method of claim 1 wherein the agreeing to specific terms comprises activating one or more checkboxes within a web-enabled interface.

7. The method of claim 1 wherein the smart contract includes preapproval to send cryptocurrency.

8. The method of claim 1 wherein the cryptocurrency includes smart contract-enabled cryptocurrency.

9. The method of claim 1 wherein the cryptocurrency includes Ethereum™.

10. The method of claim 1 wherein the digitally mapped value is uniquely coded to correspond to the wallet address.

11. The method of claim 1 wherein the encoding occurs on a server for a digital purveyor.

12. The method of claim 1 further comprising authenticating a digital transaction by reverifying the digitally mapped value with a re-encoding the wallet address.

13. The method of claim 12 wherein the re-encoding includes matching a private key signature.

14. The method of claim 13 further comprising rejecting a transaction due to the re-encoding of the wallet address not having a correct private key signature.

15. The method of claim 1 further comprising:
   enabling a smart contract for a future transaction, wherein the smart contract is associated with the wallet address of a user;
   preauthorizing the smart contract based on verified input from the user;
   authenticating payment from the user based on block chain additions; and
   providing goods to the user in response to the authenticating, wherein the goods are provided by a digital purveyor, and the future transaction is completed in accordance with the smart contract.

16. The method of claim 1 wherein the encoding further comprises using a private key to generate the digitally mapped value.

17. The method of claim 16 wherein the private key is associated with a digital purveyor.

18. The method of claim 17 wherein the digital purveyor provides one or more digital tokens.

19. The method of claim 18 wherein the one or more digital tokens provide access to a digital competition platform.

20. The method of claim 19 wherein the digital competition platform comprises an eSports platform.

21. A computer program product embodied in a non-transitory computer readable medium for authentication, the computer program product comprising code which causes one or more processors to perform operations of:
   accessing a digital ledger;
   determining a wallet address for a user, wherein the wallet address is associated with a cryptocurrency in the digital ledger;

encoding, using one or more processors, a digitally mapped value based on the wallet address, wherein the encoding further comprises inclusion of a smart contract and wherein the encoding comprises obtaining an agreement by the user to enable the smart contract;

obtaining an agreement by the user to enable the smart contract, wherein the agreement includes certifying the smart contract, wherein the certifying includes agreeing to specific terms that enable the smart contract, and wherein the agreeing to specific terms includes typing required words into a web-enabled interface;

appending an entry to the digital ledger, wherein the entry includes the digitally mapped value;

crowd-selling the smart contract; and transferring cryptocurrency from the crowd-selling of the smart contract using the wallet address that was encoded.

22. A computer system for authentication comprising:

a memory which stores instructions;

one or more processors attached to the memory wherein the one or more processors, when executing the instructions which are stored, are configured to:

access a digital ledger;

determine a wallet address for a user, wherein the wallet address is associated with a cryptocurrency in the digital ledger;

encode, using one or more processors, a digitally mapped value based on the wallet address, wherein the encoding further comprises inclusion of a smart contract and wherein the encoding comprises obtaining an agreement by the user to enable the smart contract;

obtain an agreement by the user to enable the smart contract, wherein the agreement includes certifying the smart contract, wherein the certifying includes agreeing to specific terms that enable the smart contract, and wherein the agreeing to specific terms includes typing required words into a web-enabled interface;

append an entry to the digital ledger, wherein the entry includes the digitally mapped value;

crowd-sell the smart contract; and transfer cryptocurrency from the crowd-selling of the smart contract using the wallet address that was encoded.

* * * * *